United States Patent [19]

Overby

[11] Patent Number: 4,629,980
[45] Date of Patent: Dec. 16, 1986

[54] TESTING LIMITS OF SPEED VARIATIONS IN MOTORS

[75] Inventor: Wayne A. Overby, Longmont, Colo.

[73] Assignee: International Business Machines Corporation, Armonk, N.Y.

[21] Appl. No.: 737,981

[22] Filed: May 28, 1985

[51] Int. Cl.$^4$ ............................................. G01P 3/48
[52] U.S. Cl. .................................... 324/166; 340/670; 318/317
[58] Field of Search ............... 324/160, 161, 162, 166; 318/317, 318, 301, 305, 309, 310, 311, 312, 315, 326; 361/51, 86, 90, 236, 242, 240; 346/17, 18; 340/669, 670, 671, 683, 522, 648, 661

[56] References Cited

U.S. PATENT DOCUMENTS

| | | |
|---|---|---|
| 3,767,972 | 10/1973 | Noddings et al. ............... 324/166 X |
| 3,997,869 | 12/1976 | Mayer ............................... 340/661 X |
| 4,218,879 | 8/1980 | Hagrman et al. ................ 361/240 X |
| 4,471,735 | 9/1984 | Collonia ............................ 361/51 X |
| 4,473,783 | 9/1984 | Vermesse ......................... 318/326 X |

*Primary Examiner*—Reinhard J. Eisenzopf
*Assistant Examiner*—Jack B. Harvey
*Attorney, Agent, or Firm*—Carl M. Wright

[57] ABSTRACT

Motor test circuit for supplying an error indication signal if the speed variations of a motor under test exceed predetermined limits. The circuit includes a frequency-to-voltage converter or other source of voltage proportional to the motor speed and a reference source derived from the converter's output signal so that the test results are independent from errors due to drift in the converter's parameters caused by time, temperature, or other effects.

5 Claims, 6 Drawing Figures

TESTING LIMITS OF SPEED VARIATIONS IN MOTORS

Documents Incorporated by Reference

Jose L. Monteagudo and F. del Pozo, "CMOS Frequency-to-Voltage Converter Is Highly Linear Over Wide Frequency Range," *Electronic Design* 13, June 21, 1976; p. 116.

Background of the Invention

1. Field of the Invention

This invention relates to testing motor speeds by determining whether the speed variations of the motor exceed minimum or maximum limits, or both. In particular, the invention relates to the testing of a motor using a voltage proportional to the speed of the motor under test compared to a reference voltage derived from the motor.

2. Description of Related Art

One prior art testing system uses a timing disk, i.e., a specially recorded disk having a timing track with a phase-locked loop circuit for monitoring the data as read from the timing track. This approach is sensitive to variations in the phaselocked loop caused by time and temperature changes. It requires precision amplifiers and limit detectors in addition to the phase-locked loop.

Another prior art testing procedure uses a timing disk driven by the motor under test and an FVC (frequency-to-voltage) converter. The voltage produced by the FVC is amplified and monitored by a limit detector. This approach also requires adjustable amplifiers and off-set adjustments. It is sensitive to time and temperature changes in the FVC.

SUMMARY OF THE INVENTION

In accordance with this invention, the above problems have been solved by utilizing a test circuit that compares amplified high frequency variations of the FVC output voltage to the low frequency or d.c. component of the FVC output voltage. A voltage proportional to the speed of a shaft is supplied to two circuits. One circuit amplifies the changes in voltage due to speed changes by a factor equal to the reciprocal of predetermined tolerances. The other circuit extracts a substantially constant voltage component including low frequency variations not caused by changes in speed. An out-of-tolerance signal is produced by a comparator circuit when the amplified speed change signal exceeds the substantially constant extracted value.

One advantage of this invention is that the error limits are independent from the parameters and the variations of the parameters of the FVC.

The circuit is also economical in that standard components are used and the part count is low.

BRIEF DESCRIPTION OF THE DRAWING

The invention is described below in detail referring to the various figures of the drawing which illustrate specific embodiments of the invention, and wherein like numerals refer to like elements.

DETAILED DESCRIPTION

Figure 1:
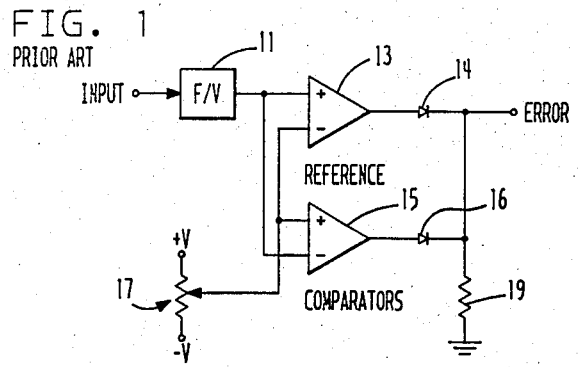
FIG. 1 is a schematic of a prior art circuit for detecting errors in the speed of a constant speed motor.
Figure 2:
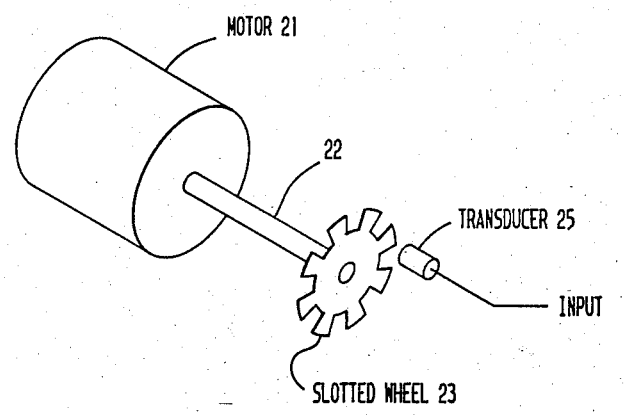
FIG. 2 is an illustration of the manner of producing an pulse train proportional to the speed of a motor.

A typical prior art circuit for testing constant speed motors is illustrated in FIG. 1. The input to the circuit is a pulse train having pulses related to the speed of the motor under test (MUT). The pulse train can be generated by a scheme such as shown in FIG. 2 where the shaft 22 of the MUT 21 is attached to a slotted wheel 23. A transducer 25 is placed in proximity to the wheel 23 and produces an output pulse each time a slot edge passes it.

The transducer 25 can operate inductively or it may utilize the Hall effect if the wheel 23 is magnetized. Other alternative, equivalent generating methods include a light source having a photocell transducer arranged so that the slots of the wheel 23 interrupt the light falling on the photocell. The number of pulses per revolution per unit time is proportional to the motor speed or, more exactly, to the rotational speed of the shaft.

Where the motor drives a disk media, it may be desirable to utilize a disk having a timing track which is read by a suitable sensing device to produce the input pulse train to the circuit of FIG. 1.

In the prior art circuit of FIG. 1, the input pulse train is coupled to the input terminal of a frequency-to-voltage converter (FVC) 11. The output signal from the FVC 11 is a voltage dependent on the frequency of the input pulse train and is coupled to an input terminal of each of two comparators 13 and 15.

A voltage proportional to the motor speed can also be derived from a tachometer driven by the motor under test. In certain situations, such as where the motor is mounted in a disk driver, the use of a tachometer is inconvenient compared to the use of a timing track on a disk which can be read by the drivers circuitry.

Coupled to the other inputs of the comparators 13 and 15 is a reference voltage which can be derived from a potentiometer 17 having its extreme terminals coupled to a positive voltage and a negative voltage. The position of the potentiometer's wiper determines the reference voltage, which is set to a value equal to the voltage that should be produced by the FVC 11 when the MUT is running at its proper speed.

The voltage from the FVC 11 is coupled to the non-inverting input terminal of the comparator 13 and to the inverting input terminal of the comparator 15. Therefore, when the output voltage from the FVC 11 rises above the reference voltage coupled to the inverting terminal of the comparator 13, the output signal from the comparator 13 will be forced high. When the output voltage from the FVC 11 falls below the reference voltage coupled to the non-inverting terminal of the comparator 15, the output signal from the comparator 15 will be forced high. Whenever the output voltage from either comparator 13 or 15 is forced high, it will create a voltage drop across an output resistor 19 through a decoupling diode 14 or 16, respectively.

The circuit of FIG. 1 operates to produce a high output voltage whenever the speed of the MUT is above or below its proper speed. A separate reference voltage can be supplied to each comparator to provide any desired range of speed tolerance limits.

Variations in the speed of a motor will typically vary about the nominal speed value at a frequency higher than variations caused by variations in the circuit parameters. Motor speed variations will be referred to as high frequency variations, and changes due to circuit parameter drifting will be referred as low frequency variations.

Figure 3A:
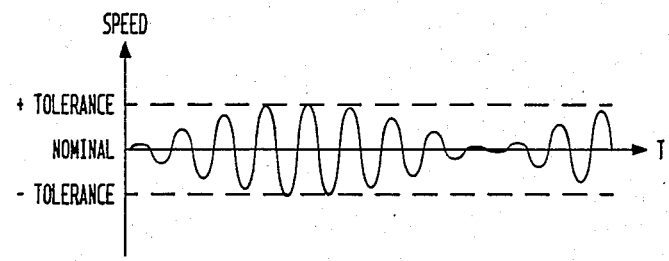
FIG. 3(A) is a graph illustrating variations in motor speed about a nominal base value.
Figure 3B:
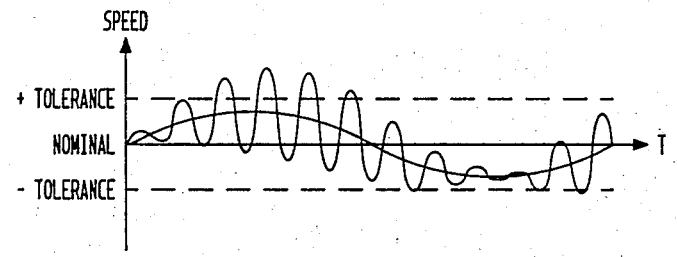
FIG. 3(B) is a graph illustrating speed variations about a varying nominal base value.
Figure 3C:
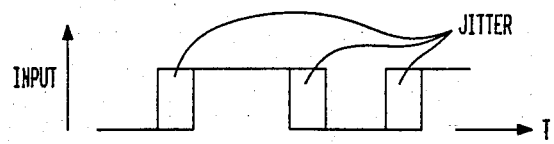
FIG. 3(C) is an illustration of the effect of high frequency variations, also called jitter, on the pulse train proportional to the motor speed.

The motor speed (high frequency) variations are illustrated in FIG. 3(A). The high frequency variations represent jitter in the positions of the rising and falling edges of the input pulses as shown in FIG. 3(C). The high frequency variations are also referred to as a.c. variations.

The prior art circuit illustrated in FIG. 1 is subject to inaccuracies caused by variations in the parameters of the FVC 11 because of changes in temperature, drift in component values, component aging, and other factors. The effect of these variations makes it appear as if the nominal base value of the speed were varying as illustrated in FIG. 3(B). The variation in the nominal value causes some of the peaks of the variations in motor speed to exceed the tolerance limits, giving a false error indication. Also, peaks that would normally exceed the tolerance limits might not because of the base line variation, thereby preventing true error indications. The apparent changes in the base or nominal value are called low frequency or d.c. changes.

Figure 4:
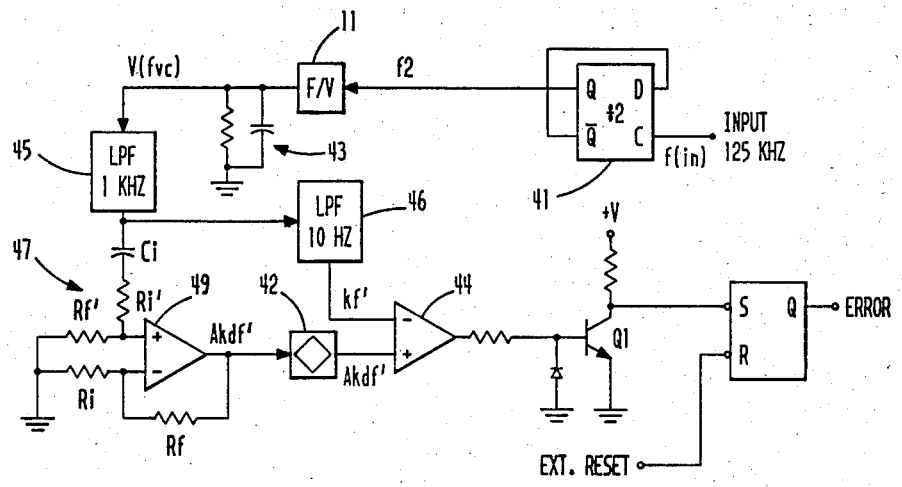
FIG. 4 is a block diagram of a test circuit according to the invention.

The circuit shown in FIG. 4 according to the invention avoids the problems encountered in the prior art circuits. The pulse train from the MUT is applied to a Divide-by-two device, shown in FIG. 4 as a toggled flip-flop 41. The actual construction is a D-type flip-flop with the inverted output feedback-coupled to the data input so that at each clock pulse, i.e., the input pulse train, the flip-flop 41 changes state. The nominal frequency of the input pulse train is 125 KHz. for illustrative purposes. The Divide-by-two device also serves to square up the input signal and to suppress any noise which might otherwise adversely affect the operation of the circuit.

The frequency of the actual input signal is denoted by $$f(in) = f + df$$

where f is the nominal frequency and df is the variation in frequency due to variations in the speed of the MUT. The value of df can be positive or negative.

The frequency of the output signal from the Divide-by-two device 41 is $$f2 = f' + df'$$

where f' is f/2 and df' is df/2.

The processed input signal, f2, is applied to the input terminal of a FVC 11. A frequency-to-voltage converter is a device which converts an input signal of pulses per unit time into an output signal of a voltage proportional to the frequency of the input signals. The transfer function of an FVC is measured in terms of volts/Hertz. The output voltage is, therefore, $$V(fvc) = Kf2$$

where f2 is the frequency of the input signal to the FVC and K is the FVC transfer function. The value of K is assumed to be constant for a particular FVC so that the relationship between the input frequency and output voltage is linear.

An example of an FVC which can be adapted for use with the invention is described in the Monteagudo and del Pozo article incorporated by reference, supra. A type CD 4050 hex buffer (RCA Corporation or Motorola, Inc.) is used with a sensing resistor in the power supply circuit to make an FVC with a linearity error less than 0.072 percent at 1 MHz. Although the output voltage is measured in millivolts, it can be amplified by well known means, e.g., using operational or instrumentation amplifiers, to any desired level. The transfer function of the FVC described in the article is approximately 0.735 mv/KHZ. If used in the circuit of FIG. 4, then, since f' is 62.5 KHz., $$V(fvc)(nominal) = Kf' = 45.9375 \text{ mv}.$$

Typically, a low-pass filter 43 is connected to the output terminal of the FVC 11. In the illustrative example, the resistor value can be 1 kilohm and the capacitor, 1 microfarad, providing a −3 dB cut-off frequency of approximately 160 Hertz. This suppresses any high frequencies transient signals, such as spikes, which may be produced by the FVC.

Another low-pass filter 45 may be used to reduce transient high frequency noise even further if desired. A −3 dB cut-off of 1 KHz. will allow the a.c. variations due to changes in motor speed to pass but will further attenuate other undesirable high frequencies. In practical circuits, such a filter is desirable but is not required for purposes of explaining the invention.

The V(fvc) signal, filtered or not, is applied to a high pass filter 47, comprising a capacitor Ci and a resistor Ri′, which passes the a.c. or Kdf′ component of V(fvc). The a.c. component is amplified by an amplifier illustrated as an operational amplifier 49 with its associated input resistor networks, Ri and Rf. The gain of the amplifier 49 is determined by the ratio Rf/Ri and is positive, i.e., the amplifier is non-inverting. The output signal from the amplifier 49 is given as AKdf′ where A is the amplification factor, Rf/Ri.

The output signal from the amplifier 49 is applied to a full-wave precision rectifier 42, a device well known in the art. Precision rectifiers typically employ operational amplifiers with high quality diodes so that the output signal is substantially the absolute value of the peak input signal. Therefore, the output signal from the full-wave precision rectifier circuit 42 is the absolute value of AKdf′ or can be considered to be AKdf′ where it is understood that its value may be zero or positive but never negative.

The V(fvc) signal, filtered or not, is also applied to a low pass filter 46 having an illustrative −3 dB cut-off frequency of 10 Hz. The purpose for the filter 46 is to extract the d.c. component of V(fvc) which is given by Kf′. The low-pass filter 46 is considered to be an active filter so that there is no insertion loss. If there is any attenuation in the Kf′ signal, a compensating attenuation is applied to the AKdf′ component signal.

The Kf′ and AKdf′ signal components are applied to a comparator 44 which can be simply an operational amplifier with no feedback. The connections to the input terminals of the comparator 44 are such that the comparator produces a high output signal whenever the value of AKdf′ exceeds that of Kf′.

The remaining components of the circuit of FIG. 4 include a level translating circuit comprising a properly biased transistor Q1 for supplying a TTL level to a flip-flop which is set by a high output signal from the comparator 44. These circuits are not part of the invention and are well known in the art.

The value of Kf' is proportional to the nominal constant speed of the MUT, which can be represented by v. The value of Kdf' is proportional to the variations in the speed of the MUT, which can be represented by dv.

The ratio AKdf'/Kf' is equal to the ratio Adv/v. AKdf' is equal to Kf' at the tolerance limit because if AKdf' is greater than Kf', the output from comparator 44 (FIG. 4) is high, setting the error indicator flip-flop. Since AKdf'/Kf' is 1 at the tolerance limit, dv/v=1/A which indicates that the tolerance limits of the speed variations of the MUT, are equal to the reciprocal of the amplification factor of the amplifier 49 which in turn is controlled by the ratio Rf/Ri. Consequently, the circuit of FIG. 4 according to the invention depends on the ratio of Rf and Ri to determine whether the MUT operates outside the test tolerance set by Ri/Rf and is independent from the parameters of the other components.

What is claimed is:

1. The combination comprising:
   means for turning a shaft at a given rotational speed;
   means coupled to said shaft for supplying a voltage proportional to the rotational speed of the shaft;
   means for extracting from said speed-proportional voltage a component value representative of the given rotational speed including any variations of said speed-proportional voltage not caused by speed variations;
   means responsive to said supplying means for amplifying changes in said speed-proportional voltage caused by speed variations by an amount equal to the reciprocal of predetermined speed tolerances; and
   means responsive to said extracting means and to said amplifying means for supplying an output signal when amplified changes in the speed-proportional voltage exceed the component value extracted from said speed-proportional voltage.

2. The combination claimed in claim 1 wherein said supplying means includes
   means coupled to said shaft for generating a series of signals representative of the rotational speed of said shaft; and
   means receiving said series of signals for providing a voltage representative of said rotational speed.

3. The combination claimed in claim 2 wherein said voltage providing means includes a frequency-to-voltage converter.

4. A method for indicating that a shaft is rotating at speeds varying more than some predetermined tolerance comprising the steps of:
   turning a shaft at a given rotational speed;
   supplying a voltage proportional to the rotational speed of the shaft;
   extracting from said speed-proportional voltage a component value representative of the given rotational speed including any variations of said speed-proportional voltage not caused by speed variations;
   amplifying changes in said speed-proportional voltage caused by speed variations by an amount equal to the reciprocal of predetermined speed tolerances; and
   supplying an output signal when amplified changes in the speed-proportional voltage exceed the component value extracted from said speed-proportional voltage.

5. In apparatus for supplying a signal indicating that variations in speed of a motor exceed predetermined tolerance limits, said apparatus including means coupled to said motor for supplying a speed voltage signal proportional to the speed of said motor, the improvement comprising:
   means for amplifying variations in said speed voltage signal by a factor equal to the reciprocal of said predetermined tolerance limits to derive a variation level voltage;
   means for extracting a reference voltage from a substantially constant component of said speed voltage signal; and
   means responsive to said reference voltage and to said variation level voltage for producing the signal indicating that variations in speed of a motor exceed predetermined tolerance limits when the value of said variation level voltage exceeds the value of said reference voltage.

* * * * *